US006284175B1

(12) United States Patent
Luippold et al.

(10) Patent No.: US 6,284,175 B1
(45) Date of Patent: Sep. 4, 2001

(54) METHOD FOR REDUCING REFLECTED RADIO FREQUENCY ELECTROMAGNETIC RADIATION

(75) Inventors: David Arthur Luippold, Fountain Valley; Mark David Brown, San Pedro; John Wilbur Tully, Rolling Hills Estates, all of CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/301,706

(22) Filed: Apr. 29, 1999

(51) Int. Cl.[7] ............................ B29C 65/40; B29C 65/42; B29C 70/88; B64C 21/02; B64C 21/10
(52) U.S. Cl. ..................... 264/105; 264/261; 264/267; 244/130; 244/132
(58) Field of Search ..................... 264/104, 105, 264/261, 263, 267, 268; 244/130, 131, 132

(56) References Cited

U.S. PATENT DOCUMENTS

| | | | |
|---|---|---|---|
| 3,797,784 | 3/1974 | Muller | 244/26 |
| 3,893,777 * | 7/1975 | Jones | 403/268 |
| 4,352,707 | 10/1982 | Wengler et al. | 156/359 |
| 4,378,322 * | 3/1983 | Atterbury et al. | 264/24 |
| 4,379,098 * | 4/1983 | Gumienny | 264/24 |
| 4,409,270 * | 10/1983 | Faber et al. | 428/63 |
| 4,555,284 | 11/1985 | Quella et al. | 156/79 |
| 4,566,990 * | 1/1986 | Liu et al. | 252/503 |
| 4,596,670 * | 6/1986 | Liu | 252/511 |
| 4,711,746 | 12/1987 | Drader | 264/36 |
| 4,861,643 * | 8/1989 | Scollard | 428/162 |
| 4,973,514 * | 11/1990 | Gamble et al. | 428/297 |
| 4,981,629 * | 1/1991 | Cook | 264/33 |
| 5,065,960 * | 11/1991 | Castellucci | 244/131 |
| 5,091,123 | 2/1992 | Fealey | 264/36 |
| 5,188,693 | 2/1993 | Nagata et al. | 156/244.11 |
| 5,366,664 * | 11/1994 | Varadan et al. | 252/512 |
| 5,487,853 * | 1/1996 | Buckley | 264/496 |
| 5,641,438 * | 6/1997 | Bunyan et al. | 264/40.3 |
| 5,645,886 | 7/1997 | Schuler, II et al. | 427/140 |
| 5,695,154 | 12/1997 | Castellucci et al. | 244/130 |
| 5,698,316 * | 12/1997 | Kuras et al. | 428/344 |
| 5,714,102 * | 2/1998 | Highum et al. | 264/105 |
| 5,770,133 * | 6/1998 | Boutaghou | 264/135 |
| 5,794,893 | 8/1998 | Diller et al. | 246/213 |
| 5,807,954 | 9/1998 | Becker et al. | 528/25 |
| 5,810,956 * | 9/1998 | Tanis et al. | 156/71 |
| 5,845,877 | 12/1998 | Justice et al. | 244/131 |
| 6,071,455 * | 6/2000 | Hutchison et al. | 264/251 |
| 6,136,116 * | 10/2000 | Reis et al. | 156/71 |

* cited by examiner

*Primary Examiner*—Angela Ortiz
(74) *Attorney, Agent, or Firm*—Terry J. Anderson; Karl J. Hoch, Jr.

(57) ABSTRACT

A highly conductive thermoplastic elastomer (TPE) gap filler having superior durability and EMI shielding properties. According to the preferred embodiment, the TPE comprises graphite fiber having a nickel-copper-nickel coating formed thereabout that is suspended within an elastomer, which preferably comprises polyvinylchloride (PVC). The TPE of the present invention is particularly well-suited for reducing radio frequency electromagnetic radiation reflected by gaps formed between adjacent panels of a structure, and is particularly well-suited for the maintenance and repair of LO aircraft. The TPE of the present invention may further be modified to include carbon black filler.

12 Claims, 1 Drawing Sheet

METHOD FOR REDUCING REFLECTED RADIO FREQUENCY ELECTROMAGNETIC RADIATION

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

Electromagnetic radiation absorbent/shielding materials and structures are well-known. Such electromagnetic radiation absorbent/shielding materials and structures are commonly used in electromagnetic capability/electromagnetic interference (EMC/EMI) test cells to eliminate reflection and interference during testing. Electromagnetic radiation absorbent materials and structures are also utilized in electromagnetic anechoic chambers for testing high frequency radar, in antennas, and in Low Observable (LO) structures.

As those skilled in the art will appreciate, the construction of devices and structures utilizing such electromagnetic radiation absorbent/shielding materials may substantially reduce unwanted or stray electromagnetic radiation by absorbing/reflecting the electromagnetic radiation emitted by the device or incident upon the structure. In this respect, contemporary electromagnetic radiation absorbent/shielding materials function by absorbing/reflecting the electromagnetic radiation according to well-known principles.

Although various materials have been found to be suitable for use in such electromagnetic absorbent/shielding structures, a problem that frequently arises concerns the treatment of gaps that are frequently formed by intermediate adjacent structural members, such as structural panels or coverings. In this regard, it is recognized that such gaps may contribute substantially to the undesirable reflection of electromagnetic radiation.

Thus, in order to reduce the reflected by a gap, it is necessary to fill the gap with an electromagnetic radiation reflective material. To that end, namely, to mitigate electromagnetic radiation reflection from such gaps between adjacent electromagnetic radiation panels and the like, conventional methodology dictates the use of a conductive filler, which is typically known to comprise nickel-coated inclusions designed to produce a material with maximum DC conductivity.

While such contemporary conductive gap fillers have proven generally suitable for their intended use, the same nonetheless possess inherent deficiencies which tend to detract from their overall desirability. Such inherent deficiencies particularly detract from the usefulness of such gap fillers in the repair and maintenance of LO aircraft. Specifically, replacement of gap treatments for frequently removed/opened access doors and panels takes too long, dependent on cure time of caulks and tapes. Lack of performance in four areas also occurs, namely: (1) some caulks are not conductive enough, due either to less conductive fillers, or less volume % loading; (2) extension and elasticity at −67° F. are too low; (3) resistance of gap fillers to aircraft fluids has been less than desired, often when using "accelerated" cures which are incomplete and thus susceptible to solvent-induced swell; and (4) adhesion and crack resistance are often low.

In this regard, it is recognized that most prior art conductive fillers fail to attain both properties of effective electric permittivity, on one hand, and resilient mechanical/material properties, on the other. The latter property is especially important when such gap fillers are utilized in LO aircraft maintenance due to the harsh environment to which such fillers will be subjected, which necessarily requires that such filler possess sufficient material durability and reliability.

Accordingly, there is a substantial need in the art for a highly conductive gap filler that possesses sufficient durability and reliability such that the same may be utilized in repair and maintenance of LO aircraft in the field. There is a further need in the art for such gap fillers that, in addition to possessing both effective electric permittivity and mechanical properties, can be readily formulated and utilized using conventional, commercially available materials.

BRIEF SUMMARY OF THE INVENTION

The present invention specifically addresses and alleviates the above-identified deficiencies in the art. In this regard, the present invention is directed to a highly conductive thermoplastic elastomer (TPE) that is particularly useful, among other things, for use in the repair and maintenance of LO aircraft in the field. According to a preferred embodiment, the gap filler comprises graphite fiber coated with a nickel-copper-nickel coating suspended within a suitable elastomer, such as polyvinylchloride (PVC). Preferably, the graphite fiber has a diameter ranging from 4 to 10 microns with 7 being preferred, and a length ranging from 0.032 to 0.060 inches. The nickel-copper-nickel coated graphite fiber is added to the elastomer such that the fiber comprises approximately 11.1% or less by weight of the resultant elastomer or, alternatively, approximately 5.39% or less by volume of the elastomer. Preferably, the resultant elastomer has a density of approximately 1.37 g/cm$^3$. The gap filler may optionally include carbon black filler, which may be co-added along with the graphite fiber, and may be present in amounts up to 14.00% by weight or 12.00% by volume of such gap filler. The resultant elastomer can advantageously attain any level of desirable EMI shielding, while at the same time possessing sufficient flexibility at reduced temperatures and withstand aircraft fluids and the like and, as such, possesses desirable durability necessary for use in LO aircraft repair and maintenance applications.

BRIEF DESCRIPTION OF THE SEVERAL VIEWS OF THE DRAWING

These, as well as other features of the present invention will become more apparent upon reference to the drawings wherein.

DETAILED DESCRIPTION OF THE INVENTION

Figure 1:
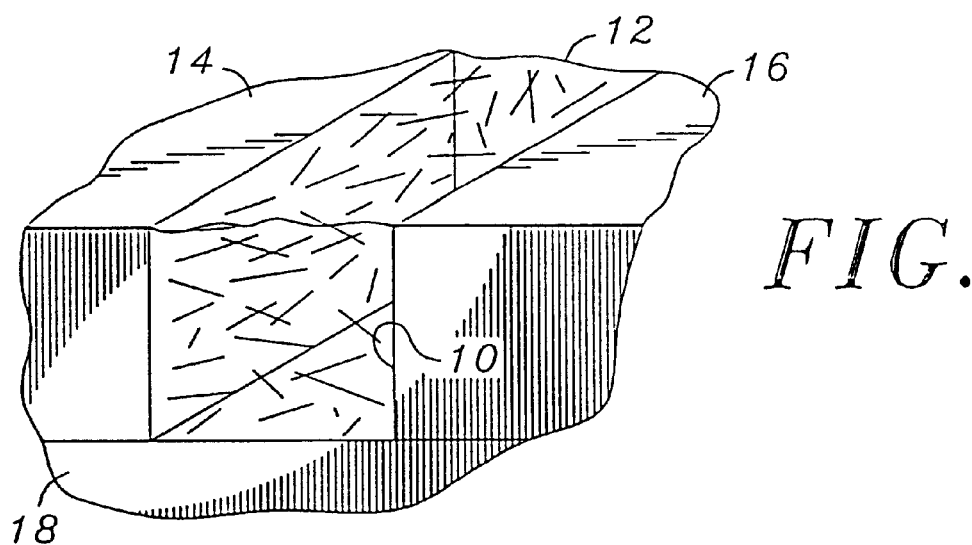
FIG. 1 is a perspective view of an exemplary gap which is infilled with a conductive gap filler of the present invention so as to enhance electromagnetic absorption thereby.

The detailed description as set forth below in connection with the appended drawings is intended as a description of the presently preferred embodiments of the invention, and is not intended to represent the only form in which the present invention may be constructed or utilized. The description sets forth the functions and sequences of steps for constructing and operating the invention in connection with the illustrated embodiments. It is understood, however, that the same or equivalent functions and sequences may be accomplished by different embodiments and that they are also intended to be encompassed within the scope of this invention.

Referring now to FIG. 1, a gap formed between adjacent first 14 and second 16 panels undesirably reflects electromagnetic radiation according to well-known principles. In order to reduce the undesirable reflection from the gap 10, a conductive filler 12 is applied to the gap 10.

According to the present invention, the conductive gap filler 12 comprises a novel, highly-conductive thermoplastic elastomer (TPE) gap filler consisting of a nickel-copper-nickel coating over graphite fiber having a diameter ranging from 4 to 10 microns, with 7 microns being most preferred. The graphite fiber further preferably is formed to have a length ranging from 0.032 to 0.060 inches. In a more highly preferred embodiment, the graphite fiber has a length of approximately 0.032 inches. It will be understood, however, that in those applications using graphite fibers of longer lengths, and particularly where the graphite fiber has the maximum length of 0.060 inches, such graphite fiber will provide greater degrees of EMI shielding, as may be necessary for certain applications.

Such nickel-copper-nickel coated graphite fiber may be obtained from Composite Materials, LLC of Tarrytown, N.Y., and sold as product "Compmat NCN PP71201." Preferably, the nickel-copper-nickel coated graphite fiber comprises 50% graphite fiber by weight, with a first layer of nickel being radially deposited therearound constituting 10% by weight of the resultant fiber, with a second copper coating radially deposited around the first nickel coating, the copper coating comprising 30% by weight of the resultant fiber. A third outer nickel coating, similar to the first nickel, is deposited around the second copper coating and preferably constitutes 10% by weight of the resultant fiber. As will be appreciated by those skilled in the art, the use of nickel prevents copper oxidation, but allows copper to be used in the practice of the present invention, which is known to have the high degree of conductivity necessary to produce high EMI shielding capabilities.

The coated graphite fiber is suspended within a thermoplastic elastomer, which preferably comprises polyvinylchloride (PVC). Although PVC is the preferred elastomer, it will be recognized by those skilled in the art that other elastomers, such as EPR (ethylene-propylene rubber), EPDM (ethylene-propylene diene monomer), polyurethane and the like, may be utilized in the practice of the present invention. A suitable thermoplastic elastomer matrix for use in the practice of the present invention includes PVC produced by Teknor Apex Co., of Pawtucket, R.I., identified as grade "Flexa OR9800-60."

The nickel-copper-nickel coated graphite fiber is blended within the elastomer such that the coated fiber ranges from 0.040% to 38% by weight of the elastomer, or 0.1% to 24% by volume of such elastomer. In a more highly preferred embodiment, the coated graphite fiber is loaded at approximately 11.1% by weight of the elastomer, and 5.39% by volume of the elastomer. It is further contemplated that carbon black filler may be co-added with such fiber, as may be necessary for a given application. In this regard, such component, (i.e., carbon black filler) may be present in such gap filler in an amount of 14.00% by weight and 12.00% by volume. In any application, it is preferred that the resultant elastomer with coated graphite fiber, with or without carbon black, suspended therein has a density ranging from 1.4 to 1.7 g/cm$^3$, with a density of approximately 1.5 g/cm$^3$ being most ideal.

Advantageously, the TPE of the present invention can be immediately utilized with commercial off-the-shelf equipment, and in particular "hot glue gun" applicators. In this regard, it has been found that the TPE of the present invention can be applied using a conventional "hot glue gun" at 350° F. (such guns generally dispense at a rate of approximately 8.4 lb/hr at temperatures 250°–420° F.). Exemplary of such conventional "hot glue guns" is the H. B. Fuller Model 660-G industrial hot melt glue gun applicator produced by H. B. Fuller of Wilmington, Mass. Once so applied, the caulk may be smoothed using an industrial grade soldering iron at 350° F., avoiding cure (with shrinkage) and delayed skive cutting. It has been found that the TPE of the present invention is particularly well-suited for "butter-in, fly-away" gap treatment replacement procedures using the aforementioned technique.

Advantageously, the TPE of the present invention provides substantial EMI shielding while at the same time retaining material properties that have sufficient durability and reliability for use in a wide variety of applications, and in particular the maintenance and repair of LO aircraft. In this regard, it has been found that the TPE of the present invention is extremely resistant to aircraft fluids, such as JP5, JP8, de-icing fluid, hydropic fluid, and lubricating fluids. Moreover, the TPE of the present invention possesses a high degree of flexibility, and has even proven to be flexible at −67° F.

As an illustration, a non-resistive example of the highly-conductive thermoplastic elastomer gap filler, conforming to the present invention is given below.

EXAMPLE 1

2.5 g NiCuNiGr (3.0 g/cc) were added to 20 g PVC TPE (1.37 g/cc) in 250 ml NMP (N-methyl pyrrolidone, i.e., 2-pyrrolidone, N-methyl). This NMP solvent is tenacious and persistent, and is not found as an aircraft solvent. This gives 11.1% by weight (5.35% by volume) loading of highly conductive fiber. This enables dissolution of fibers into PVC, followed by removal in vacuum above 83° C., the boiling point of NMP in vacuum. It is desired to not approach the 202° C. boiling point of NMP in atmospheric pressure, as this oxidizes the NMP (recall that such organics oxidize above 451° F., i.e., Fahrenheit 451). Allowing a slight amount of NMP to remain in the composition assists both (1) wet-out and adhesion to gaps when applying with H. B. Fuller Model 660 commercial off-the-shelf (COTS) hot glue gun at 350–420° F., and (2) smoothing to outer mold line surface with 350° F. industrial grade soldering iron. For a given volume loading of fiber, testing shows higher desired EMI shielding using fibers of 0.060Δ length than for 0.032Δ length, but electrical roughness is less for 0.032Δ length fibers, with adequate EMI shielding.

An additional preferred embodiment is to reduce electrical roughness by adding carbon black "Vulcan XC72R" obtainable from Cabot Corporation of Billerica, Mass. to the nickel-copper-nickel coated graphite fibers "NiCuNiGr" and PVC TPE as shown in Examples 2, 3 and 4.

EXAMPLE 2

26.722 g NiCuNiGr (3.0 g/cc) plus 35.0 g Vulcan XC72R carbon black (1.75 g/cc) were added to 191.386 g PVC TPE (1.37 g/cc) in 427.2 g NMP solvent. This gave 10.56% by weight (5.31% by volume) of highly conductive NiCuNiGr fiber and 13.83% by weight (11.93% by volume) of carbon black in PVC TPE on a solids basis. The solvent assisted heat melting of PVC TPE elastomer by solvent NMP, removal of NMP by heating in vacuum, and further application by hot glue gun are similar to the teachings in Example 1.

EXAMPLE 3

10.812 g NiCuNiGr (3.0 g/cc) plus 3.157 g Vulcan XC72R carbon black (1.75 g/cc) were added to 48.643 g PVC TPE (1.37 g/cc) in 88.765 g NMP solvent. This gave 17.27% by weight (8.81% by volume) of highly conductive NiCuNiGr fiber and 5.04% by weight (4.41% by volume) of carbon black in PVC TPE on a solids basis.

EXAMPLE 4

7.2 g NiCuNiGr (3.0 g/cc) plus 3.157 g Vulcan XC72R carbon black (1.75 g/cc) were added to 50.320 g PVC TPE (1.37 g/cc) in 91.84 g NMP solvent. This gave 11.87% by weight (5.87% by volume) of highly conductive NiCuNiGr fiber and 5.20% by weight (4.41% by volume) of carbon black in PVC TPE on a solids basis.

EXAMPLE 5

13.214 g NiCuNiGr (3.0 g/cc) were added to 49.991 g PVC TPE in 91.225 g NMP solvent. This gave 20.91% by weight (11.00% by volume) NiCuNiGr fiber in PVC TPE on a solids basis.

EXAMPLE 6

4.1 g NiCuNiGr (3.0 g/cc) were added to 25.482 g PVC TPE in 46.5 g NMP solvent. This gave 13.86% by weight (7.0% by volume) NiCuNiGr fiber in PVC TPE on a solids basis.

EXAMPLE 7

5.274 g NiCuNiGr (3.0 g/cc) were added to 24.934 g PVC TPE in 45.5 g NMP solvent. This gave 17.46% by weight (9.0% by volume) NiCuNiGr fiber in PVC TPE on a solids basis.

Although the invention has been described herein with specific reference to a presently preferred embodiment thereof, it will be appreciated by those skilled in the art that various modifications, deletions, and alterations may be made to such preferred embodiment without departing from the spirit and scope of the invention. Accordingly, it is intended that all reasonably foreseeable additions, modifications, deletions and alterations be included within the scope of the invention as defined in the following claims.

What is claimed is:

1. A method for reducing radio frequency electromagnetic radiation reflected by a gap present between adjacent panels of a structure, the method comprising:

a) applying a gap filler to substantially fill said gap present between adjacent panels of a structure, the gap filler comprising:

i) a thermoplastic elastomer matrix;

ii) a plurality of conductive fibers dispersed within said matrix, said conductive fibers comprising coated graphite fiber having a first layer of nickel radially deposited thereabout, a second intermediate layer of copper radially disposed about said first layer of nickel, and a third outer layer of nickel radially deposited about said second layer of copper about; and iii) wherein said conductive fiber comprises up to approximately 50% by weight of said graphite fiber, up to approximately 10% by weight of said first layer of nickel, up to approximately 30% by weight of said intermediate layer of copper and up to approximately 10% by weight of said outer coating of nickel; and b) smoothing said gap filler deposited within said gap.

2. The method as recited in claim 1 wherein said thermoplastic elastomer comprises polyvinylchloride.

3. The method as recited in claim 1 wherein said graphite fiber has a diameter ranging from 4 to 10 microns.

4. The method recited in claim 3 wherein said graphite fiber has a diameter of approximately 7 microns.

5. The method recited in claim 1 wherein said graphite fiber has a length ranging from 0.060 to 0.032 inches.

6. The method recited in claim 5 wherein said graphite fiber has a length of approximately 0.060 inches.

7. The method recited in claim 5 wherein said graphite fiber has a length of 0.032 inches.

8. The method recited in claim 1 wherein said coated graphite fibers comprise 0.04% to 38% by weight of said gap filler. 1.37 g/cm3.

9. The method recited in claim 1 wherein in step b), said gap filler is smoothed via a solder iron.

10. The method of claim 1 wherein in step a), said gap filler further comprises:

ii) carbon black filler.

11. The method of claim 10 wherein said carbon black filler is present in an amount not greater than 14.00% by weight of said gap filler.

12. The method of claim 10 wherein said carbon black filler is present in an amount not greater than 12.00% by volume of said gap filler.

* * * * *